(12) United States Patent
Szlam et al.

(10) Patent No.: US 6,868,395 B1
(45) Date of Patent: Mar. 15, 2005

(54) BUSINESS TRANSACTIONS USING THE INTERNET

(75) Inventors: Aleksander Szlam, Alpharetta, GA (US); Karl A. Walder, Marietta, GA (US); Boguslaw Gil, Doraville, GA (US)

(73) Assignee: CIM, Ltd. (KY)

( * ) Notice: Subject to any disclaimer, the term of this patent is extended or adjusted under 35 U.S.C. 154(b) by 0 days.

(21) Appl. No.: 09/469,587

(22) Filed: Dec. 22, 1999

(51) Int. Cl.$^7$ .......................... G06F 17/60; G06F 15/21
(52) U.S. Cl. ................. 705/27; 705/400; 705/401; 705/402; 705/403; 705/404; 705/405; 705/406; 705/407; 705/408; 705/7; 705/10; 705/14; 709/217; 709/218; 709/219; 709/238; 407/530; 407/531
(58) Field of Search ................ 705/27, 26, 400–408; 709/217–219, 238

(56) References Cited

U.S. PATENT DOCUMENTS 4,799,156 A * 1/1989 Shavit et al. ............... 705/26
6,073,112 A * 6/2000 Geerlings .................. 705/10

OTHER PUBLICATIONS

Microsoft Press, Second Edition, The Comprehensive Standard for Business, School, Library, and Home, 1994, p. 143.*

* cited by examiner

Primary Examiner—James P. Trammell
Assistant Examiner—Daniel L. Greene
(74) Attorney, Agent, or Firm—Bourque & Associates

(57) ABSTRACT

In a campaign, a customer's file is reviewed to determine the offer or solicitation to send to the customer and the time such will remain open, and an e-mail message is sent to the customer that contains the offer or solicitation in text, a packet, or a URL address for a protected personalized web page (501). The packet may be opened on-line or off-line allowing the customer to provide information or terms that are subsequently sent to (505) the originator. Alternatively, such information is obtained via the protected, personalized web page to which the customer is referred. If the customer provides acceptable information and terms (510, 515), the transaction is completed (520).

8 Claims, 14 Drawing Sheets

301

| TOTAL DEBT / PURCHASE AMOUNT | 305 |
| INITIAL PAYMENT AMOUNT | 310 |
| MONTLY PAYMENT AMOUNT | 315 |
| NUMBER OF MONTHS TO PAY | 320 |
| INTEREST RATE | 325 |
| TOTAL PAYMENTS | 330 |
| TOTAL INTEREST PAYMENTS | 335 |

YES  I AGREE  SEND  CANCEL

NO  CALL AGENT  ASSISTANCE REQUESTED

FIG. 3

BUSINESS TRANSACTIONS USING THE INTERNET

TECHNICAL FIELD

The present invention is related to implementation of business transactions over an electronic communications network, such as the Internet.

BACKGROUND OF THE INVENTION

The Internet has become a major vehicle for transportation of information regarding products and services. This arises because a person can obtain information on a variety of products and services, from different vendors, and without having to talk to a human operator whose job function is attempt to sell that product or service to the person.

The Internet has also become, to a lesser degree, a vehicle for transacting business, such as sales of products and services offered via the Internet. However, a problem frequently occurs when a person wishes to purchase a product. A person can visit the web site of a company and determine what product is to be bought, but there is generally no procedure whereby the person can communicate with another person to obtain further information about the product or discuss the purchase of the product. Thus, the person must accept the product with insufficient information, in which case the person may later wish to return the product, or the person must decline the purchase, in which case the company has lost a sale.

Still another problem occurs once the person has decided upon a product or service because the payment choices are usually limited to a major credit card, or a credit line previously established with the seller, both of which generally carry pre-arranged, fixed payment terms and interest rates. The person may want the product or service, but would be unable to comply with the payment terms, or may find the payment terms or interest rate unacceptable. This inflexibility of payment choices deters some people from making the purchase, or from making the purchase over the Internet. Thus, customer satisfaction is not achieved, and a sale is lost.

A different type of problem occurs when a person makes a purchase, or takes a loan, and is unable to make the payments as scheduled. That person quickly becomes nonresponsive to letters demanding full payment immediately, and to telephone calls from collection agents demanding payment in accordance with non-negotiable terms. Thus, customer resentment rises, the debt is not easily collected, and future sales are lost.

Still another problem is that, to conduct some business transactions, the customer must view, approve and sign one or more documents. However, such documents may be confidential, and the company may not wish to simply publish those documents on a web site, or to simply send them to an e-mail address.

Further, many conventional sales or collection transactions are handled by call centers which employ numerous agents. These agents typically handle incoming calls from potential purchasers or debtors, and outgoing calls to those persons. When an agent has to spend time with a person proposing terms, discussing terms, waiting for the person to consider the terms, and obtaining approval for terms, the efficiency of the agent suffers, and the operating costs of the call center increase.

SUMMARY OF THE INVENTION

The present invention addresses these problems. The present invention allows a business to contact a customer electronically via an eEnvelope™ packet that contains various information such as, but not limited to, e-mail text, audio, video, and other interactive graphical user interfaces ("GUI"). Upon opening the eEnvelope packet, the customer may select a link to a protected URL/web site personalized for that customer. The personalized web site is prepared based on the customer information already known by the business. Through the personalized web site goods and services of interest are presented to the customer. The website may be password or ID protected as necessitated by the transaction.

Alternatively, the eEnvelope packet will carry an interactive promotion application and its corresponding processor module, such as an executable code module. When the customer selects the interactive promotion, the customer will be able to view or listen (if audio is included) or watch (if video is included) a presentation and respond to areas of interest. The interactive promotion will run off-line; that is, it will run directly on the customer's computer, and not be simply a sequence of screens generated by the remote server and sent via the Internet. When the customer responds to the interactive promotion, the customer's input will be automatically sent back to the business's host for an update of the customer file and for additional processing if required. For example, the interactive promotion may be a sales pitch for palm top computing devices. During the presentation the customer may indicate s/he already owns a particular model and is not currently interested in purchasing another device but may be interested in purchasing software for the model that the customer owns. The customer file will be updated to record that the customer owns a particular palm top computer. If a sale is made, then the sale of particular software to the customer will be confirmed and recorded. Therefore, the interactive promotion piece will result in updating the customer data file and closing a transaction.

The invention also includes a help request within the eEnvelope packet that can be used to obtain assistance. The assistance may be accomplished automatically by a server that reviews the information, screens, and/or web sites visited by the customer, determines the areas of confusion, and then pushes additional information and or web sites to the customer. Alternatively, live assistance may be offered via an agent who joins the customer and either pushes URLs or engages in a one-on-one chat with the customer. Further, a voice conversation may be added whereby the agent speaks with the customer via a voice over IP (VoIP) connection, or via a phone line over the public switched telephone network (PSTN). Additionally, should the customer or agent need assistance from another party, that party will be joined to the communication session to collaborate with the agent and/or help the customer. For example, if the eEnvelope packet contains a presentation regarding palm top computers, the customer may request help from an agent regarding software for the customer's palm top computer. As the agent and customer discuss alternatives, they may work with an agent from another entity to learn how the particular palm top computer, loaded with the software, will be able to communicate with the customer's home computer.

The eEnvelope packet may contain a payment or repayment program or information on payment or repayment terms, and limits thereon, established by the seller or creditor. Thus, the person, whether potential purchaser or debtor, can input desired payment terms into the program, and the program will determine whether the terms desired by the person are within the limits established by the seller or creditor. If not, the program can display the out-of-bounds factors and suggest or accept other terms which will be within those limits. Once the person has selected terms which are both acceptable to that person and within the established limits, the packet will send those terms to the seller or creditor. The packet may be uploaded to the web site of the seller or creditor, or may be an attachment to an e-mail to the seller or creditor.

The present invention provides for sending an electronic packet to the person so that the person can, in the privacy of home, consider and define payment or repayment terms which are viable for both that person and for the seller or creditor. The packet may be sent either automatically or at the request of the person. The packet may be a download from a web site of the seller or creditor, or may be an attachment to an e-mail from the seller or creditor.

The present invention reduces or eliminates the amount of agent time required. Thus, in addition to allowing the person to select such terms at home, in privacy, and in a relaxed manner, the present invention also reduces the operating costs of the call center.

The present invention thus provides for the purchaser or debtor to review and select payment or repayment terms within the limits established by the seller or creditor, or to propose terms outside of those limits, and to negotiate those terms with an agent.

The present invention also provides for a purchaser to review information and documents which are not available to the general public at a company's web site.

The present invention also provides for a web site customized by the company for a 10 particular individual, whereby that individual can review and approve documents and terms.

Thus, the present invention allows the purchaser or debtor to select and agree to payment or repayment terms which are acceptable to both that person and to the seller or creditor.

One method of conducting business in accordance with the present inventions provides for sending a first e-mail message to a party, the first e-mail message including a first enclosure, the first enclosure being for allowing the party to select transaction terms within a specified time, receiving a second e-mail message from the party, the e-mail message including a second enclosure, the second enclosure being at least a portion of the first enclosure after the party has selected the transaction terms, inspecting the second enclosure to determine the transaction terms which were selected, determining whether the transaction terms which were selected are acceptable, and sending a third e-mail message to the party, the third e-mail message indicating approval or rejection of the transaction terms which were selected. The first enclosure includes a plurality of the transaction terms and limits on the transaction terms. Determination of whether the transaction terms which were selected are acceptable is accomplished by comparing the transaction terms which were selected with the limits on the transaction terms. The first enclosure may include a software applications program, a plurality of transaction terms, and predetermined limits for the transaction terms.

Another method for conducting business in accordance with the present invention provides for establishing a protected web site customized for an individual for a set time period, sending a message to the individual inviting the selected individual to visit the customized web site informing the individual of the code (password, ID, ETC.) needed to access the protected web site, receiving a request from the individual to visit the customized web site, sending a first web page to the individual, the first web page allowing the individual to select transaction terms, receiving a selection of the transaction terms from the individual, determining whether the transaction terms which were selected are acceptable, and sending a second web page to the individual indicating approval or rejection of the transaction terms which were selected. The first web page includes the transaction terms and limits on the transaction terms. Determination of whether the transaction terms which were selected are acceptable is accomplished by comparing the transaction terms which were selected with the limits on the transaction terms.

Another method for conducting business in accordance with the present invention provides for establishing a web site customized for an individual for a set time period, sending a first message to the individual inviting the individual to visit the customized web site, informing the individual of the code (password, ID, ETC.) needed to access the protected web site, receiving a request from the individual to visit the customized web site, sending a first web page to the individual, the first web page allowing the individual to download a first packet, the first packet including a plurality of transaction terms, receiving a request from the individual to download the first packet, sending the first packet to the individual, receiving a request from the individual to upload a second packet, the second packet being based upon the first packet, sending approval to the individual to upload the second packet, receiving the second packet from the individual, inspecting the second packet for selected transaction terms, determining whether the selected transaction terms are acceptable, and sending a second message to the individual indicating approval or rejection of the selected transaction terms. The first packet includes a plurality of the transaction terms. Determination of whether the transaction terms which were selected are acceptable is accomplished by comparing the selected transaction terms with limits on the transaction terms. The first packet may include a software applications program, a plurality of transaction terms, and predetermined limits for the transaction terms.

Another method for conducting business in accordance with the present invention provides for sending a packet via e-mail to an individual, and the packet presents a plurality of transaction terms to the individual, receives a selection of the transaction terms from the individual, determines whether the transaction terms which were selected are acceptable, and if the transaction terms which were selected are acceptable then presenting to the individual an indication of approval of the transaction terms which were selected. If the transaction terms which were selected are not acceptable then an indication of rejection of the transaction terms which were selected is sent to the individual. An indication of the transaction terms which were not acceptable, and the predetermined limits for the transaction terms which were not acceptable may also be presented.

Another method for conducting business in accordance with the present invention provides for generating a first list of persons to be contacted, obtaining e-mail addresses for the persons, sending e-mail messages to the persons, the e-mail message to a person including information about a subject particular to the person, checking for responses to the e-mail messages, generating a second list of persons to be contacted, the second list being a subset of the first list, and including persons who have not responded to the e-mail messages within a specified time, and placing telephone calls to the persons on the second list. The second list includes persons who have responded to the e-mail messages and have requested further contact regarding the subject. In addition, a third list may be generated, the third list including persons who were on the second list who did not respond to the telephone calls, and additional e-mail messages are sent to the persons on the third list, an additional e-mail message including information about a subject particular to the person.

Another method for conducting business in accordance with the present invention provides for establishing a protected web site customized for an individual, sending a first message to the individual inviting the individual to visit the customized web site, and informing the individual of the code (password, ID, ETC.) needed to access the protected web site, receiving a request from the individual to visit the customized web site, sending a first web page to the individual, the first web page presenting a plurality of transaction terms and including a request for at least one of assistance or further information, receiving a request from the individual for at least one of assistance or further information, connecting an agent to the web page so that the agent and the individual have access to the web page, presenting a dialog box on the web page whereby the individual and the agent can exchange messages, and receiving messages from the individual and the agent and presenting the messages in the dialog box.

Still another method for conducting business in accordance with the present invention provides for establishing a protected web site customized for an individual, sending a first message to the individual inviting the individual to visit the customized web site, informing the individual of the code (password, ID, ETC.) needed to access the protected web site, receiving a request from the individual to visit the customized web site, sending a first web page to the individual, the first web page presenting a plurality of transaction terms and including a request for at least one of assistance or further information, receiving a request from the individual for at least one of assistance or further information, connecting an agent to the web page so that the agent and the individual have access to the web page, establishing a voice-over-internet link between the agent and the individual, and allowing the agent and the individual to communicate by voice while having access to the web page.

BRIEF DESCRIPTION OF THE DRAWINGS

FIG. 3 is an illustration of the screen that a customer may see for selection of the terms.

DETAILED DESCRIPTION OF THE INVENTION

Figure 1:
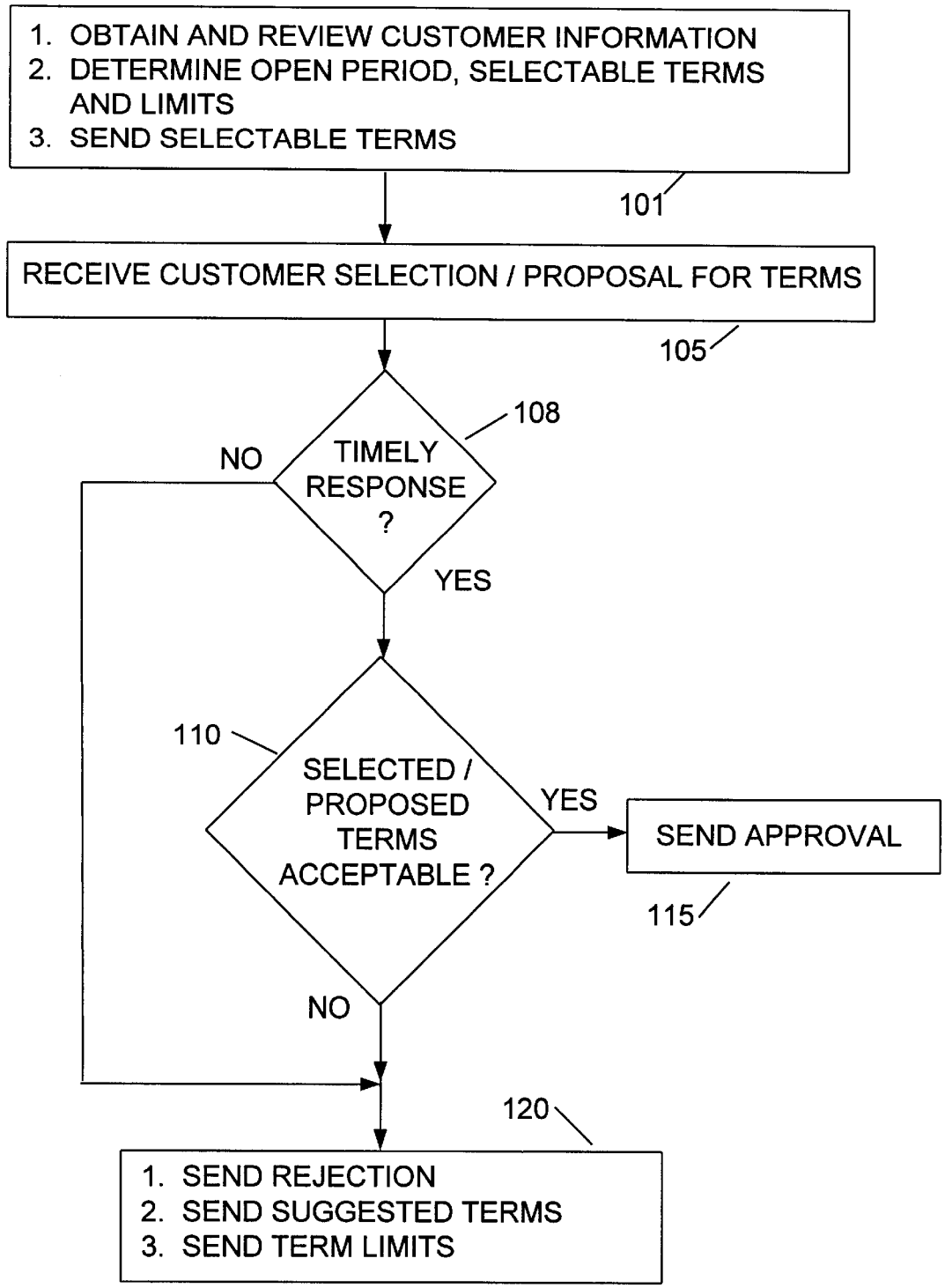
FIG. 1 is an illustration of the preferred process of the present invention.

Turn now to the drawings, in which FIG. 1 is an illustration of the preferred process of the present invention. In step 101 the customer information is obtained from the customer records or database and reviewed. Based upon this information and the campaign, the open period is chosen, the selectable terms are determined, the limits for those terms are determined, and those selectable terms are sent to the customer for review and selection. The open period is the amount of time an offer or solicitation remains open for a customer. The open period is based upon the individual, the campaign, and/or the company. For example, a marketing campaign would allow for a longer open period than a collection campaign. The selectable terms and the limits for those terms are based upon the customer information, such as the customer's credit history, payment record, income, etc. For example, a customer with a high income and a good credit history may be offered terms, such as longer payment times, lower payment amounts, and/or lower interest rates, than those terms which are offered to a person with a low income or a bad credit history. These terms and limits may vary from company to company, depending upon the prior payment experience of a company with its customers as a whole, or the company's determination as to what the selected market will bear. In some cases, the company will allow the customer to propose terms outside the normal limits. In other cases, the company will not allow the customer to propose terms outside the normal limits but will restrict the customer to selection of terms which are within those specified limits.

In step 105 the customer's selected or proposed terms are received.

In step 108, the time of receipt is compared to the open period to determine if the customer's response was received timely. If so, the terms are reviewed in step 110. If not, the customer is notified of rejection in step 120 and preferably, the customer is provided with some suggested terms or with term limits so that the customer may submit revised terms for approval.

In step 110 the selected or proposed terms are reviewed for acceptability. This is preferably performed automatically by comparison of the selected terms with the limits therefor. Preferably, the limits determined in step 101 are acceptable and if the selected terms fall within those limits then approval is automatic. However, tentative approval may also be given, awaiting final approval by an agent or supervisor after a review of the customer's information to verify that nothing in the customer's credit or payment history or status has changed which would make the original limits unacceptable.

If the terms are acceptable then, in step 115, the customer is notified of the approval. If the terms are not acceptable then, in step 120, the customer is notified of the rejection and, preferably, the customer is provided with some suggested terms or with term limits so that the customer may submit revised terms for approval.

Figure 2A:
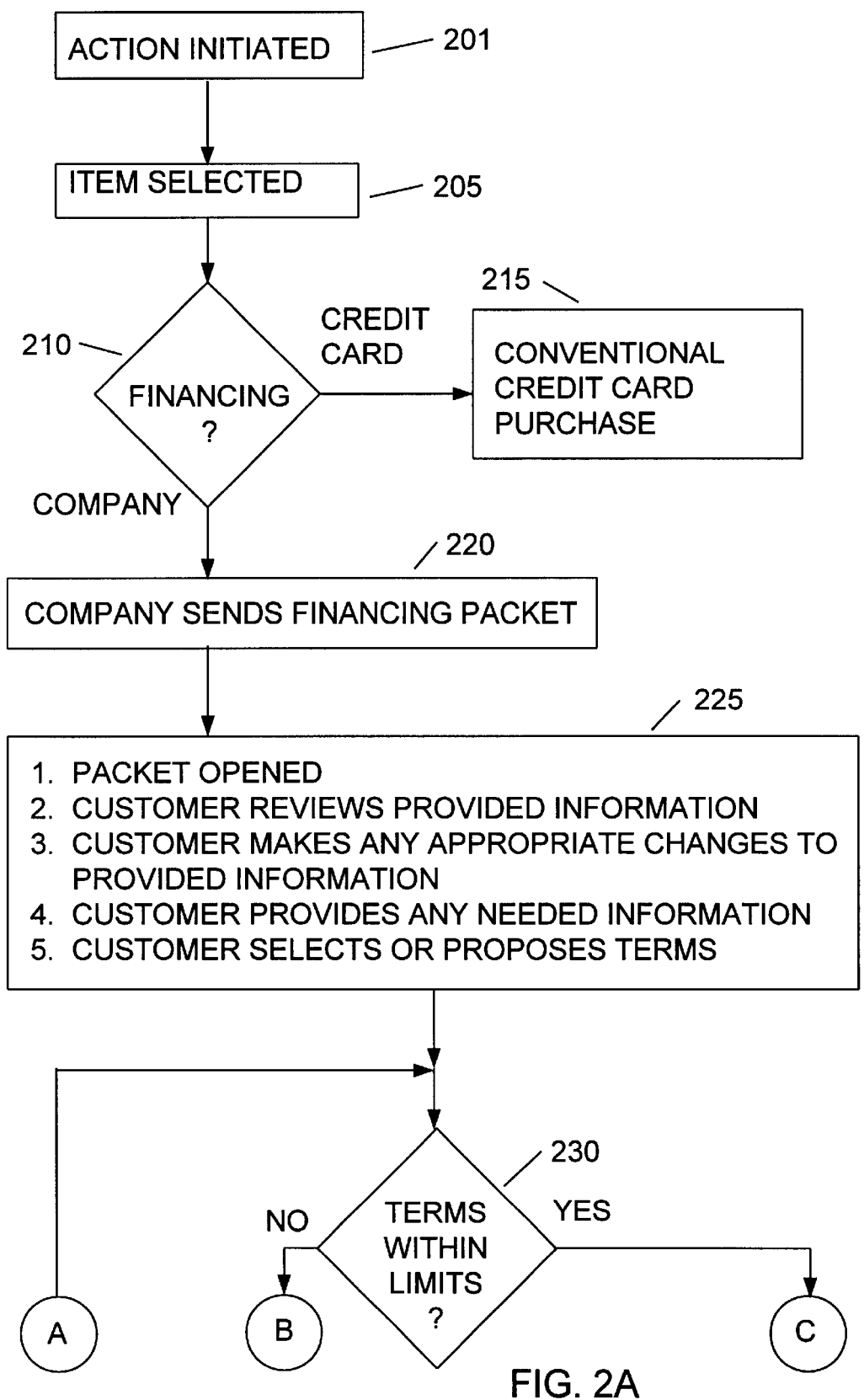
FIGS. 2A–2C are a detailed flowchart of the operation of the present invention.
Figure 2B:
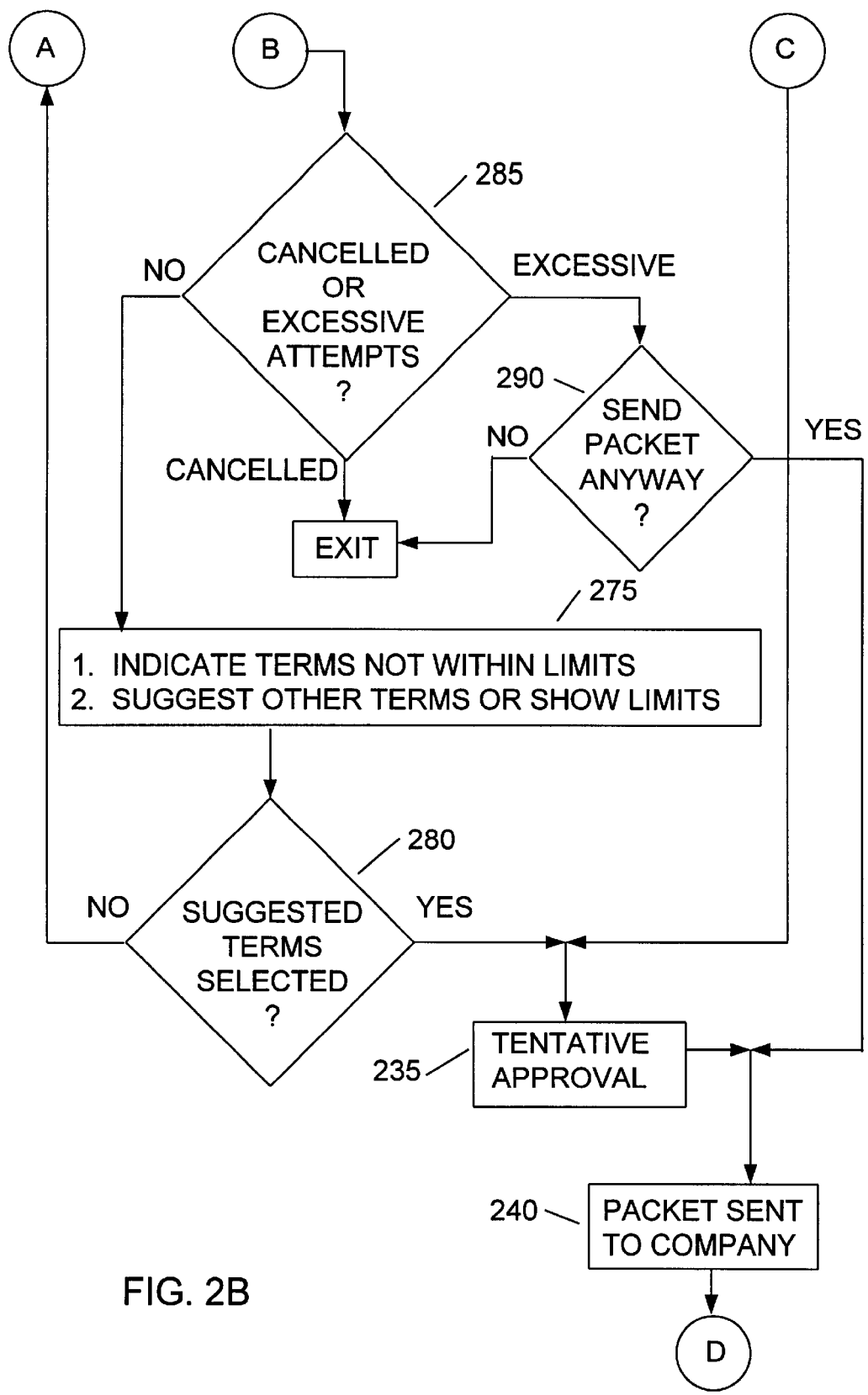
Figure 2C:
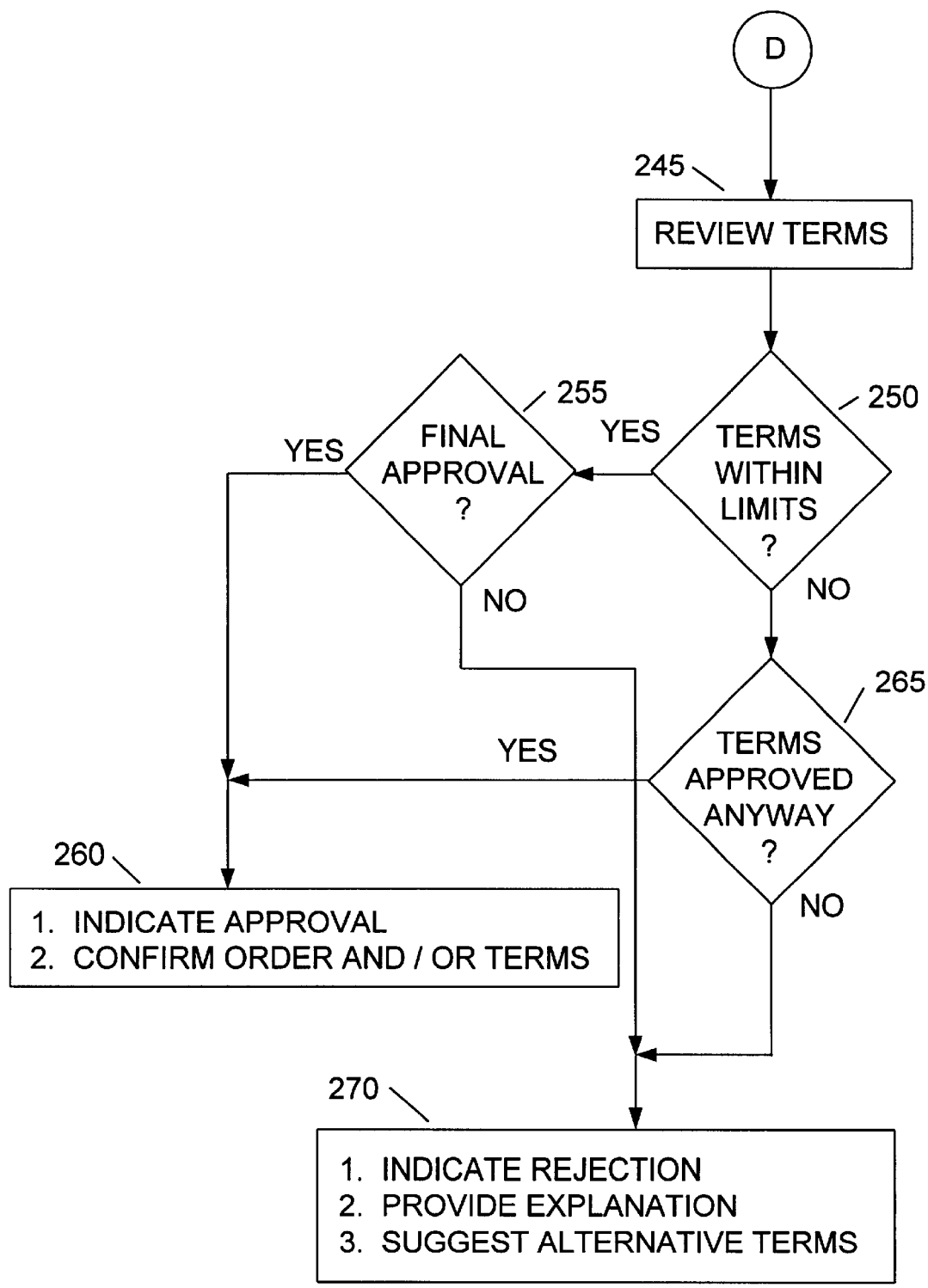

FIGS. 2A–2C are a detailed flowchart of the operation of the present invention. In step 201 the action of the present invention is initiated. The action may be initiated by the potential purchaser or debtor, referred to herein as the customer, or may be initiated by the seller or creditor, referred to herein as the company. Consider the first case, where the action is initiated by the customer. The customer logs onto the Internet. The customer may be looking for a particular product or service, referred to herein as the desired item, or may be just "surfing the Internet". The customer finds the desired item at the company web site and decides to purchase it by selecting the desired item at step 205.

The customer is then given a choice in step 210 regarding financing of the purchase. The customer may specify that the purchase is to be made by credit card, debit card, bank draft, company financing, COD, or any other type of financial arrangement. Selection is made by any desired technique, such as by clicking on a button or buttons indicating the desired item or the type of financing desired, and/or sending a code or codes designating the desired item, the type of financing desired, etc. If the customer selects "credit card" then in step 215 a conventional credit card purchase is transacted. However, assume that in step 210 the customer indicates that financing is to be provided by the company.

In response to the indication by the customer that the customer desires company financing of the desired item, in step 220 the company web site server then sends the customer a packet, such an a eEnvelope packet, for financing of the desired item. This may be accomplished by the server automatically presenting a screen which instructs the customer to click on a button, or to take some other action, to cause the packet to be downloaded to the customer's computer. This may also be accomplished automatically by the server sending the packet as an attachment to an e-mail sent to the customer's e-mail address.

The packet is preferably, or preferably contains, executable code, such as an applet, which does not require any other programs for use. In another embodiment, the packet may be a document written for a commonly used program, such as Microsoft™ Word or Excel, Corel™ WordPerfect, Lotus™ 1-2-3, etc., so that the customer can open the document using such a program. Once the customer has obtained the packet, the customer can open the packet at his (or her, as the case may be) convenience, either while still connected to the Internet, or after the customer has logged off the Internet. The customer then double clicks on the packet, or selects "Open" and then specifies that packet, or takes other appropriate action on his computer to cause the packet to be opened. In still another embodiment, the packet opens itself automatically upon completion of downloading. Thus, in step 225 the packet is opened for review and completion by the customer.

The packet may ask the customer to provide certain information, such as the customer's name, address, telephone number, e-mail address, social security number, credit references, etc. Alternatively, if the customer has previously established credit with the company, the packet may have this information included and simply ask the customer to verify it. Of course, for protection of the customer, certain information is preferably not initially included in the packet, such as the customer's social security number or other credit card numbers, and the customer may be asked to fill in such information in order for the company to confirm the identity of the customer. Alternatively, the packet may specify that some or all of this information is to be provided by the customer. The packet also preferably contains the ordering information for the desired item, such as the company product code for that item, the price, the description, the weight, any shipping charges, any taxes, etc.

Once the information is provided, confirmed, or modified, as appropriate, the customer can then select the payment terms, such as dollars per month, months to pay, desired interest rate, initial payment, etc. The packet then compares the selection with the company specified limits. For example, the company limits for that item or for that purchase amount may require that the purchase must be paid for within 36 months, or that the minimum payment must be $100 per month, or that to obtain an interest rate of less than 18% the customer must make an initial payment of $500 and/or pay off the purchase within 24 months, combinations of the above, etc. These limits do not specify non-negotiable payment terms in and of themselves, but simply specify the extremes of the payment terms which are acceptable to the company.

In step 230, if the customer's selection of terms is within the specified limits then, in step 235, the packet indicates that the selection is tentatively approved. The customer then sends the packet back to the company in step 240. This may be accomplished by any desired means, such as by clicking on a button which causes the packet to automatically send itself or a document created by it to the company via the Internet, attaching the packet or the document to an e-mail and sending it to the company via the Internet, etc. The button may be explicit, such as a "Send" button, or may indicate something different, such as "Information Complete" or "Terms Selected".

Once the packet or the document created by the packet has been received by the company, review and approval of the packet occur in step 245. As indicated above with respect to FIG. 1, review and approval may be automatically performed by the company computer system, such as verifying in step 250 that the selected terms are within the limits specified by the company, the terms were timely received, and that the packet has not been tampered with, or a manual process, that is, requiring a human operator to review and approve the selected terms. Approval may also be a combination of the above, with automatic review by the company computer system to verify that the terms are within limits and final review 255 by a human operator who verifies that the information appears to be valid and does not contain obviously false or fictitious names or addresses, and that the terms are appropriate for the current credit or payment history of that customer. The customer's credit history and report may be also given a final review 255 by a human operator before approval is granted.

In an alternative embodiment, the customer may be asked for preliminary information so that the credit history may be obtained and reviewed, and the term limits set, before the packet is sent to the customer for completion.

If approval is granted, a message, preferably an e-mail message, is sent to the customer in step 260 indicating approval and confirming the order and the terms. Alternatively, a personalize web site may be updated to reflect the status of the transaction. The method selected of contacting the customer should be determined in conjunction with the manner most preferred by the customer as described in U.S. Pat. No. 5,594,791 as Customer Sensitivity Profiling.

If approval is not granted in step 255, then in step 270 an e-mail or other message is sent to the customer indicating same and, preferably, the reason why, such as which terms are not acceptable. Another packet may also be sent, or the customer may be asked to re-open the original packet and select new terms. The customer may then select new terms, and reapply.

If, at step 250, the customer's selection of terms is not within the specified limits, the proposed terms are sent to a human operator for review and consideration at step 265. If approved, step 260 is performed. If disapproved, step 270 is performed.

If, at step 230, the customer's selection of terms is not within the specified limits, the packet tests in step 285 whether there has been an excessive number of attempts to select the terms or whether the customer wishes to cancel the transaction.

If there has not been an excessive number of attempts then in step 275 the packet indicates that one or more terms are not within allowable limits, preferably indicates such limits, and provides one or more suggestions which will be within such limits.

The customer may select one of such suggestions, or may make another selection, or may select one of such suggestions for modification and then input such modifications. Step 280 determines whether the customer has selected the suggested terms without modification. If so, then step 235 is performed.

If the customer selects the suggested terms but then proposes any changes to the suggested terms or to any other terms, or if the customer specifies new terms, then step 230 is executed again.

Steps 230, 275, 280 and 285 may be repeated until terms within acceptable limits are selected, or the customer cancels the process, or a certain number of failed attempts has been made. In step 285, the customer may indicate that the transaction should be cancelled and, in this case, the program will end. Also, in step 285, if an excessive number of attempts has occurred, then step 290 will ask the customer whether to send the proposed terms even though they are not within the specified limits. If, at step 290, the customer does not wish to send the proposed terms then the program will end. If, at step 290, the customer does wish to send the proposed terms to the company, then step 240 is performed.

In an alternative embodiment, even if in step 230 the customer has not selected payment terms which are within the company limits, the packet may be programmed to send the customer's proposed terms to the company for consideration as in step 240.

A slightly different situation occurs with respect to collection of past due or overdue accounts. In this situation, the debtor is generally not "surfing the Internet" looking for information about the creditor or payment terms. Thus, in this situation, the company takes the initial action by sending an e-mail containing the packet to the debtor. Alternatively, the e-mail may invite the debtor to visit the company web site to obtain the packet. Thus steps 201 through 220 may, in effect, be performed by the company with little or no action by the debtor.

Further, in the collections scenario, there is no product or service for the debtor to select because the "product" is an existing debt. In addition, the company already has substantial information on the debtor. Therefore, in step 225 the packet may only ask the debtor to verify the information and then select the repayment terms. Repayment terms, like the previously discussed payment terms, may be selected by the debtor, within the limits set by the company. The repayment terms in this situation may be very different from the first situation because, in this situation, the debtor has failed to meet previously agreed payment or repayment terms. However, the remainder of the process is the same as above for a customer purchasing a desired item; that is, the person selects the terms, within the limits specified by the company, or proposes other terms, and the company reviews the terms and approves them, if satisfactory, with the entire transaction being accomplished via the Internet, and a packet providing the programming, instructions, and company limits. With collections, the period open will usually be of greater importance.

In another embodiment, rather than sending a packet to the customer, an e-mail message is sent to the customer inviting the customer to visit the company's web site using one of the commercially available Internet browser programs. When the customer visits the web site the customer is asked to provide identification, such as one or more of the person's name, address, telephone number, account number, social security number, driver's license number, etc. The customer is then connected to a web page personalized for that customer. In another embodiment, the e-mail message may contain an identification number. When the user visits the company web site, the user inputs the provided identification number and is then connected to that web page. In another embodiment, the e-mail message may contain a hyperlink to the company web site or to that web page. The customer clicks on the hyperlink and is then transported to that web site or web page. In still another embodiment, the e-mail message may provide a complete or "deeplinked" address for the user to enter, such as www.company.com/%webpageaddress%. The user then enters that complete address and is then transported to that web page.

The personalized web page is set-up to remain accessible for a specific open period based on the campaign, customer, and/or company. After the open period has expired, the web page would display an expiration message explaining that the open period has expired and inviting the customer to re-initiate the transaction via a different means.

In the preferred embodiment, that web page is customized for that person. That is, the web page contains and/or requests the same information and options as would be available in the =packet described above. The customer then reviews, selects, and completes the information and options, but at the web page rather than via the packet.

FIG. 3 is an illustration of the screen 301 that a customer may see for selection of the terms. The total debt or purchase is shown in block 305. This may be fixed, such as where the customer has selected an item for purchase, or where the customer is a debtor, or may be a value which can be provided by the customer, such as where the customer is requesting a new or increased line of credit with the company. The initial payment amount is shown in block 310. This may be one or more fixed amounts specified by the company, and selectable by the user, or may be fixed by the company, or may be open for suggestion by the customer. The monthly payment is shown in block 315. This figure may be fixed by the company, may have a set of values for the customer to select from, may be open for suggestion by the customer, or may be determined by the selection of other items, such as the total debt or purchase amount, the interest rate, the number of months desired for payment, the initial payment, etc. The number of months for payment is shown in block 320. Again, this figure may be fixed by the company, may have a set of values for the customer to select from, may be open for suggestion by the customer, or may be determined by the selection of other items. The interest rate is shown in block 325. Again, this figure may be fixed by the company, may have a set of values for the customer to select from, may be open for suggestion by the customer, or may be determined by the selection of other items. The total payments are shown in block 330. This figure is based upon the initial payment, the monthly payment amount, and the number of months for payment. The total interest payments are shown in block 335. This figure is based upon the monthly payment amount, the number of months for payment, and the interest rate.

FIG. 3 also illustrates some exemplary buttons which may appear on the screen, such as: Yes, No, I Agree, Send, Cancel, Call Agent, and Assistance Requested. Other or different buttons may also be used as needed for the particular function being implemented.

Figure 4A:
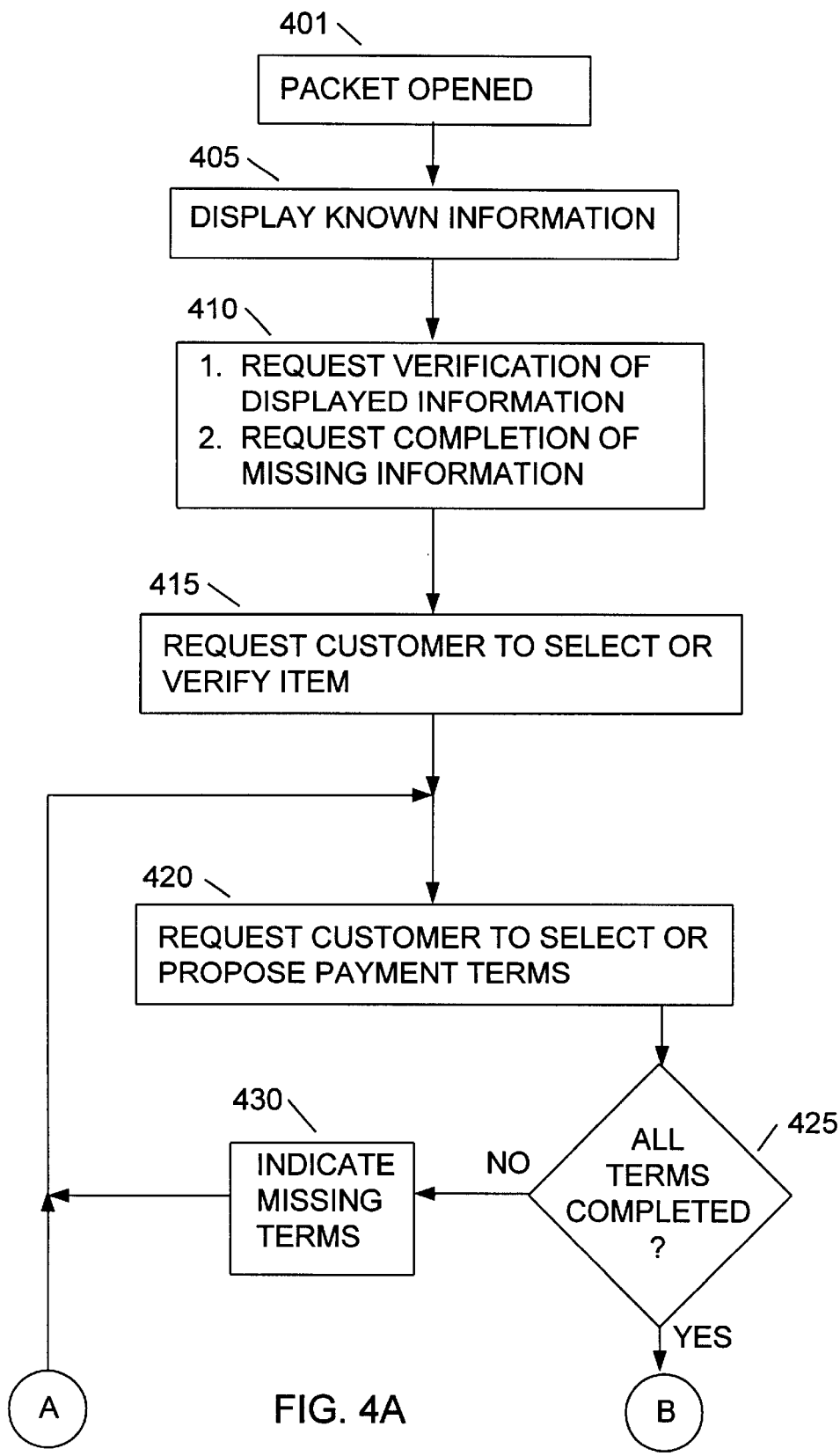
FIGS. 4A–4B are a flowchart illustrating the operation of the packet of the present invention.
Figure 4B:
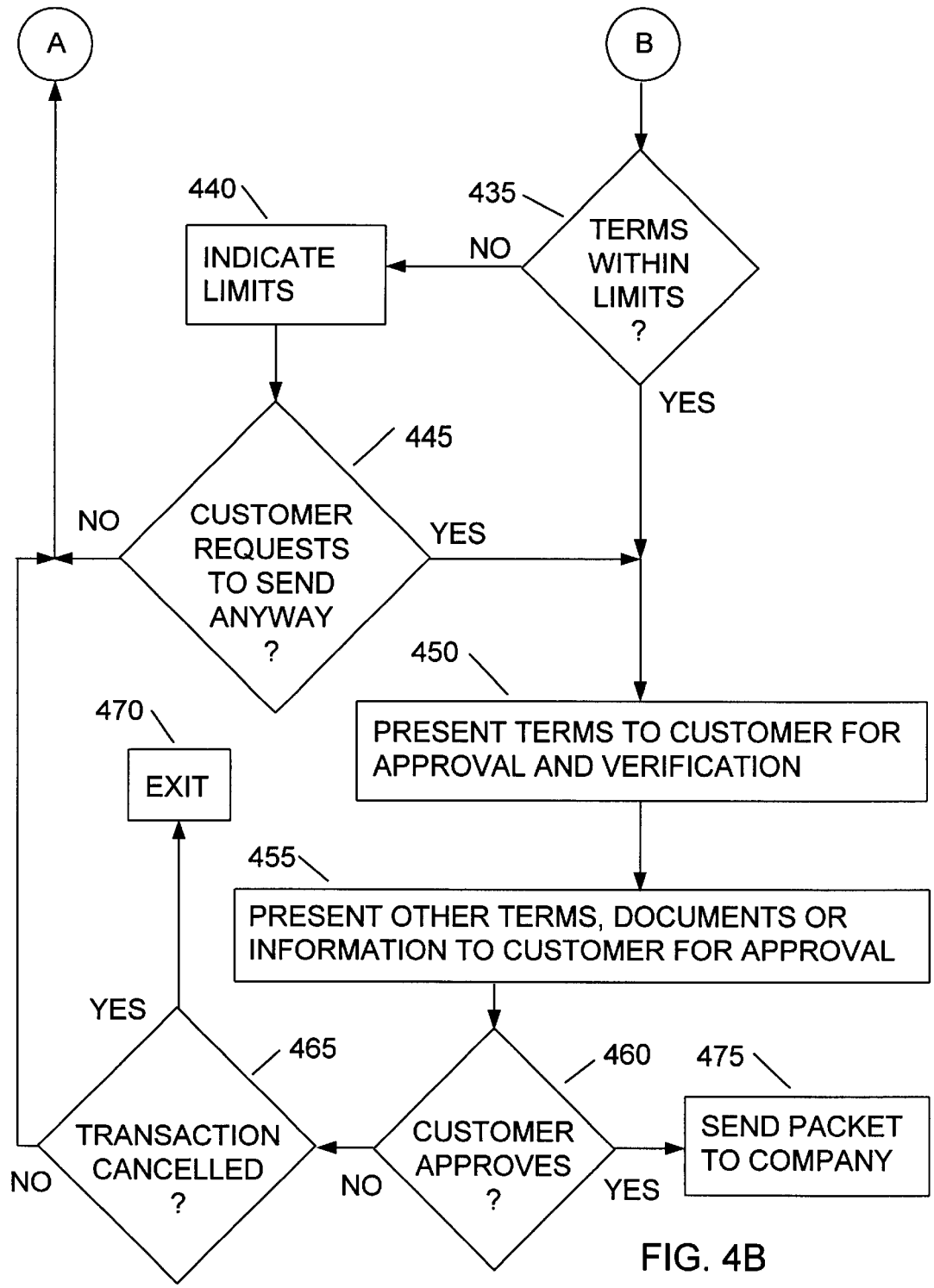

FIGS. 4A–4B are a flowchart illustrating the operation of the packet of the present invention. In step 401 the packet is opened, either automatically or by action of the customer.

In step 405 the packet displays selected, known information about the customer. This information preferably includes the customer's name, address, telephone number, e-mail address, social security number, credit references, etc. The information presented may be complete, partial, or none, as available, and/or as may be limited by any laws or company policies regarding customer privacy and protection.

In step 410 the packet requests that the customer verify the displayed information and complete any missing information.

In step 415 the packet requests the customer to select or verify the selected item. This step is skipped where the customer is a debtor as there is no item to select.

In step 420 the packet requests the customer to select or propose the payment terms. The packet may not display any limits, and await the customer's input to determine if the customer's preference is within limits, or may specify limits and instruct the customer to select a term within those limits. The first option is advantageous in that it provides the company with information as to what the customer would select if possible, so that the company can consider whether to review and revise its limits. The second option is advantageous in that it tells the customer what the limits are prior to selection so that the customer does not select a limit and then be disappointed by its immediate rejection.

In step 425 the packet determines whether all of the terms have been completed, that is, either selected or proposed. If not, then step 430 advises the customer that certain terms are missing and step 420 is performed. The selection of certain terms may automatically cause the selection of other terms, or automatically set the limits for other terms. For example, the selection of a payment plan of $100 per month may automatically cause the payment term to be 30 months at an interest rate of 21%, or between 20 and 40 months at interest rates between 12% and 25%. The relationship between terms may be strictly determined by amortization tables, or may be may determined by amortization tables used in conjunction with the risk involved with longer payment terms, with lower payment amounts, or with lesser initial payment amounts.

If all of the terms have been completed, then step 435 determines whether the selected or proposed terms are within the specified limits. If not, then step 440 indicates the limits for the terms. Step 445 then asks the customer whether the proposed terms should be sent even though not within the limits. If so, then step 450 is performed.

In step 435, if the completed terms are within the limits, then step 450 is performed.

In step 445, if the customer does not request the terms to be sent anyway, or if the customer is not offered that option, then step 420 is performed.

Step 450 presents the terms to the customer for approval and verification.

In step 455 other information may also be presented, such as the item ordered, the terms of the contract or sale or financing, other legal or contract language, statements that all information provided is correct and complete to the best of the customer's knowledge, or other desired information and/or agreements. The customer is asked to check one or more boxes indicating agreement to the terms, or verifying the accuracy of the information, etc.

Step 460 tests whether the customer has approved the presented information. If so then, in step 475, the packet, or a document created thereby, is ready for transmission to the company, and it is then sent to the company via the Internet for further processing. Transmission may occur automatically, such as when a "Complete" or "I agree" box is checked, or may occur at the customer's instruction, such as by the customer clicking on a "Send" box, as shown in FIG. 3.

If the result of step 460 is negative, then step 465 tests whether the customer has cancelled the transaction. If so then the program ends. If not then step 420 is performed to provide the customer the opportunity to change the terms or select new terms.

Figure 5:
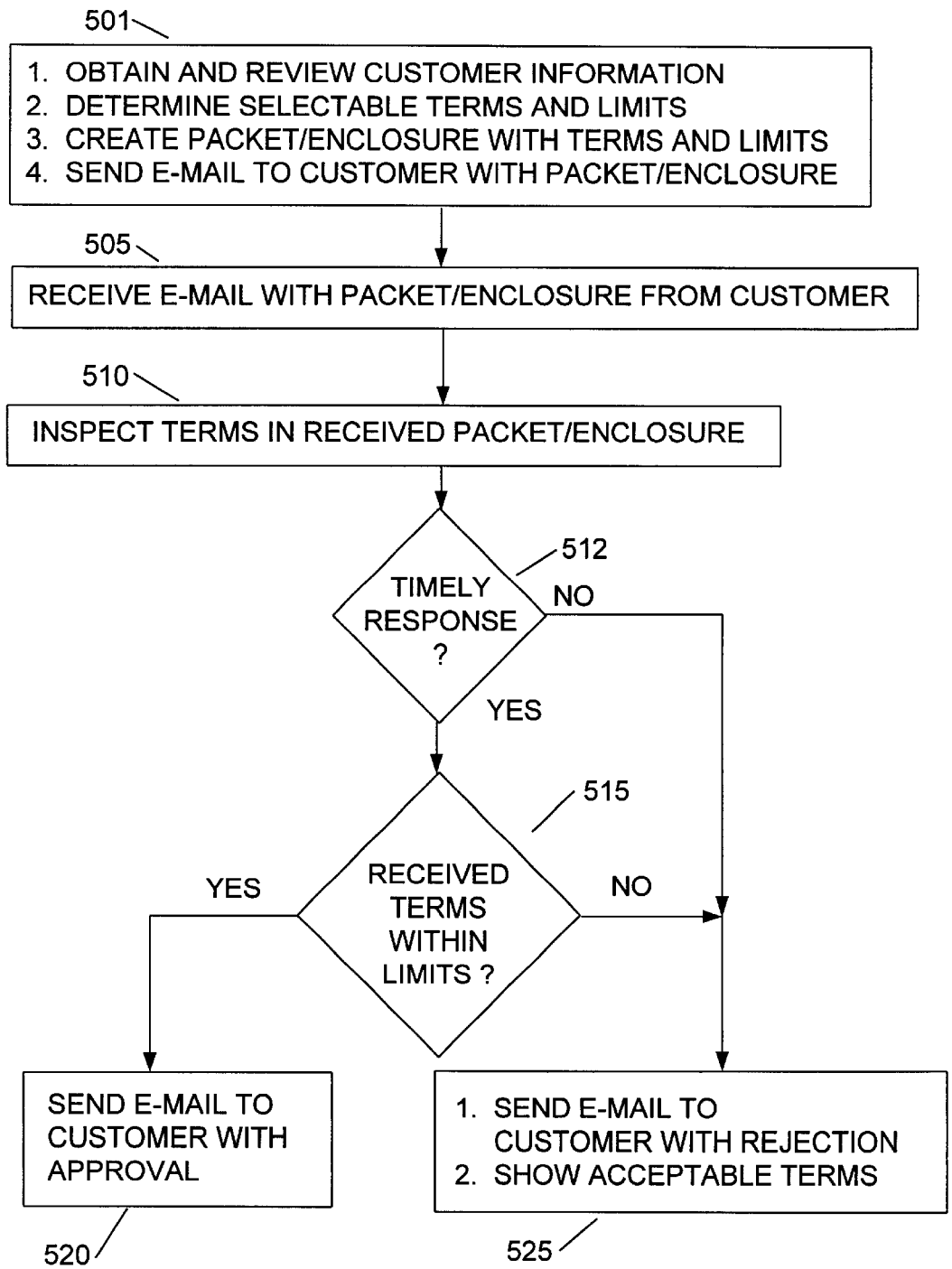
FIG. 5 is a flowchart of the operation of the server of the present invention.

FIG. 5 is a flowchart of the operation of the server of the present invention. Briefly summarized, a server obtains and reviews information regarding the customer and generates payment terms and term limits. The server generates an enclosure for an e-mail message, including the payment terms and the limits. The e-mail message, with the enclosure, is then sent to the customer. (501) The customer receives the e-mail message and opens the enclosure. The customer selects or proposes payment terms which are within these limits, and then sends the modified enclosure back to the company. The modified enclosure is received (505) by the server. The server inspects (510) the terms selected or proposed in the received enclosure and tests (515) whether the selected or proposed terms are within these limits. If so, the server sends (520) notice of approval to the customer, preferably via an e-mail message. If not, the server sends (525) a notice of rejection to the customer. In another embodiment, the server sends an e-mail message to the customer inviting the customer to visit a company web site customized for that customer. That is, the web page contains and/or requests the same information and options as would be available in the enclosure. The customer then reviews, selects, and completes the information and options, but at the web page rather than via the enclosure.

More particularly, in step 501 the information regarding the customer is reviewed and, based upon that information, the period open, the terms and the term limits are generated. Then, the enclosure for the e-mail message is generated, including the terms and limits therefor. The e-mail, with the enclosure, is then sent to the customer.

In step 505 an e-mail message, with the modified enclosure, is received and time stamped by the server.

In step 510 the server inspects the terms selected or proposed in the received enclosure.

In step 512, the server compares the date the response was received with the open period.

If the response was received timely, then the terms are reviewed. If not, then step 525 is performed.

In step 515 the server tests whether the selected or proposed terms are within the specified limits. If so, then step 520 is performed, and approval is sent to the customer, preferably via an e-mail message. If not then step 525 is performed, wherein a rejection notice is sent to the customer, preferably via an e-mail message, and may show the open period (new) and acceptable limits so that the customer can review these limits and submit revised proposed terms.

Figure 6A:
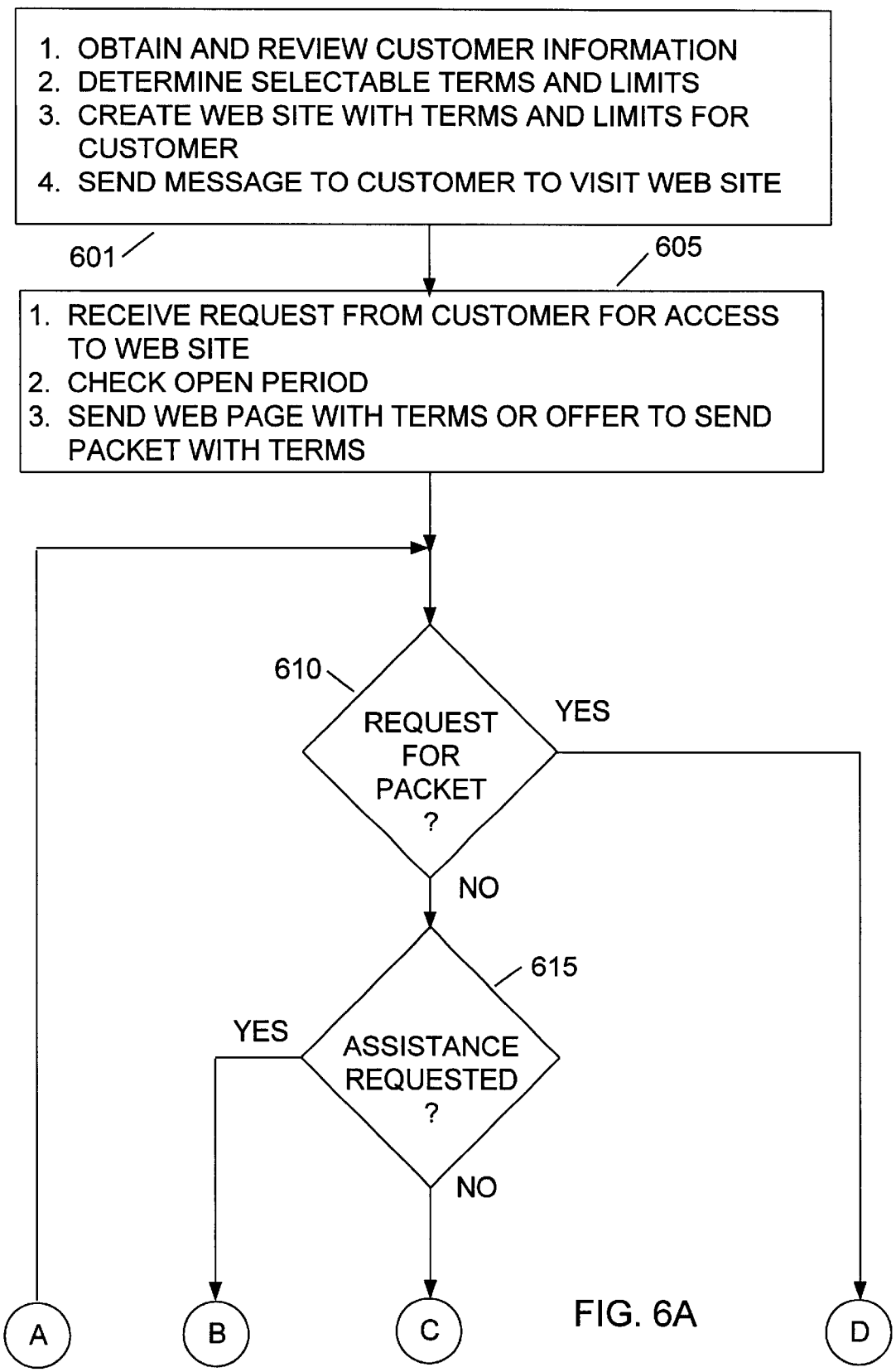
FIGS. 6A–6C are a flowchart of the operation of the web server of the present invention.
Figure 6B:
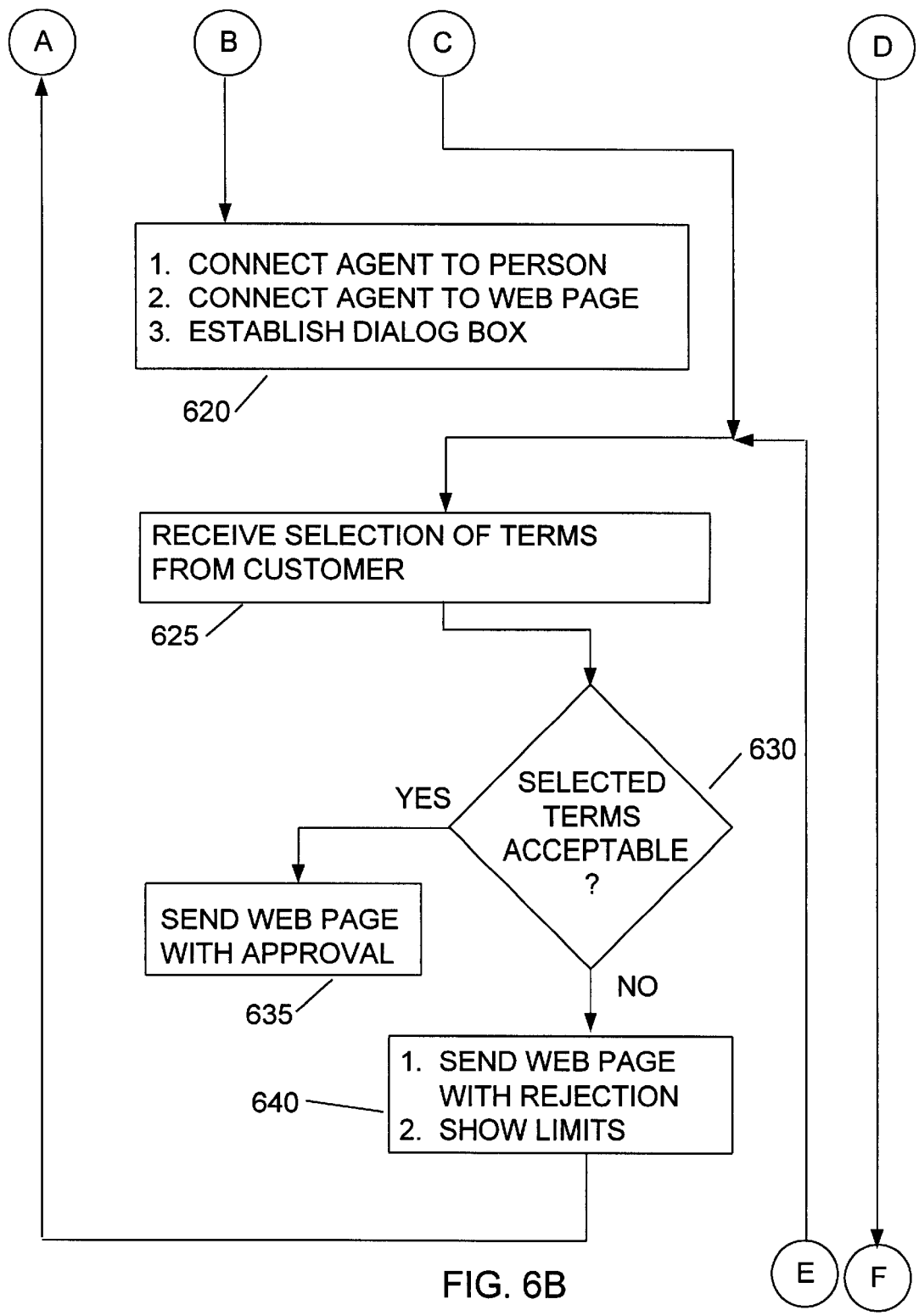
Figure 6C:
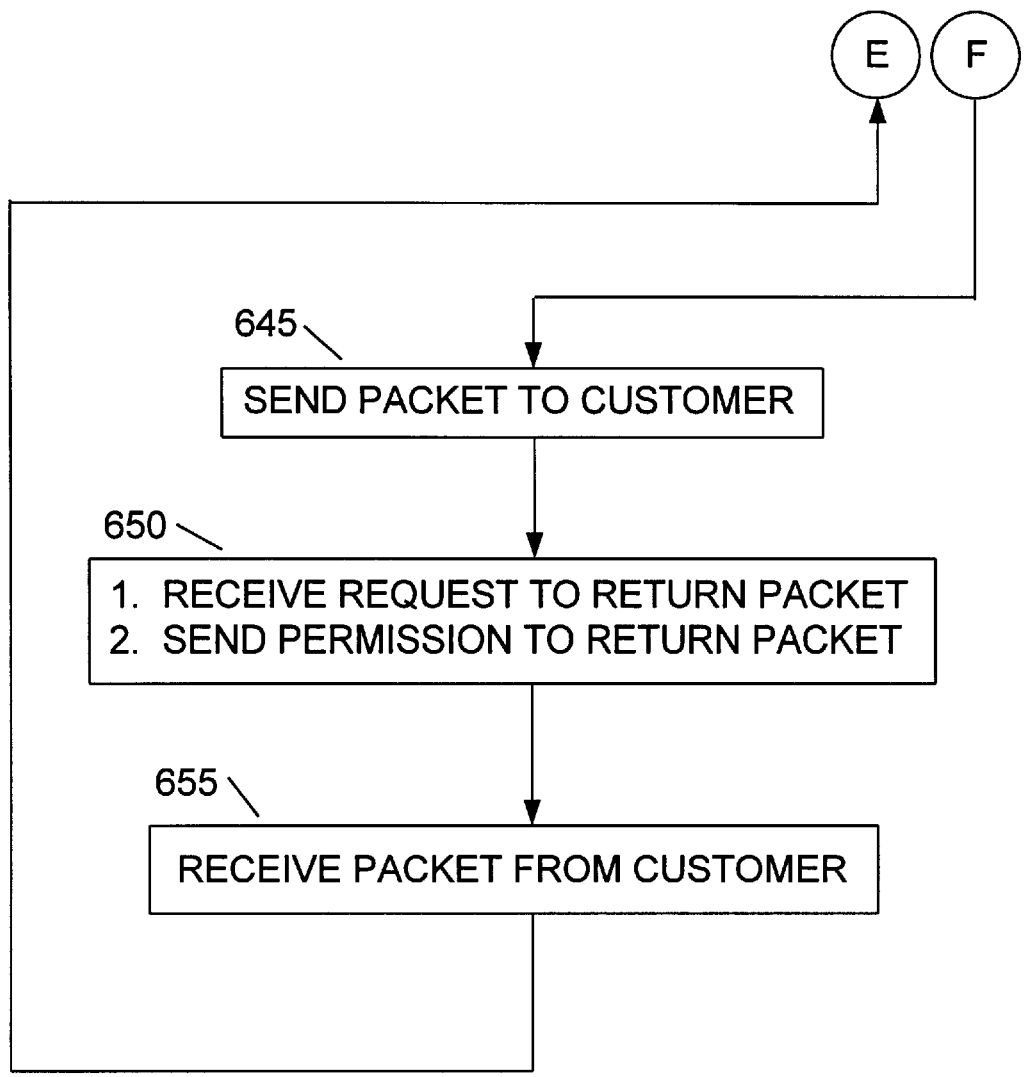

FIGS. 6A–6C are a flowchart of the operation of the web server of the present invention. In step 601 the customer information is reviewed, the appropriate terms generated, and the term limits selected, as described above. Then, a customized web site is created for that customer, preferably with the generated terms and term limits. The web site is designed to be accessible to the customer for an open period. A message is then sent to the customer, preferably by e-mail, inviting that customer to visit the web site customized for that customer.

In step 605 the web server receives a request from the customer for access to the customized web site. The open period is checked to determine if the customized web site is still accessible to the customer. If not, the customer is denied entry due to untimeliness. If the request is timely, verification of the identity of the customer may be required at this point. The customized web page is then sent to the customer. The customized web page may have the terms displayed thereon, or may offer the customer the option of downloading a packet, or both.

Step 610 determines whether the customer has requested the packet. If not, or if a packet is not available for that customer, then step 615 tests whether the customer has requested further assistance.

Consider now the situation wherein the customer is at the web page completing the information but does not understand certain terms or conditions. In the preferred embodiment the customer may click a "Connect to Agent" box or "Call Agent" box as shown in FIG. 3. In this case, in step 620, an available agent will be connected to the same web page. The identification number, or the web page accessed, identifies the customer. Thus, specific information regarding that customer is already known by the company. Therefore, rather just connecting the customer to any available agent, this information is preferably used to connect the customer with a preferred agent, that is, an agent appropriate for that customer. For example, the customer may be connected with an agent who speaks a particular language, such as French, or with a collections agent, or with an agent who can approve a credit line increase. Therefore, the present invention allows the customer to be connected the agent most appropriate for that customer. Of course, if the preferred agent is not available, then the customer will be connected to an available agent, or to the next available agent. The customer is then directly connected to the agent. In the preferred embodiment, a dialog box will appear both on the customer's screen and on the agent's screen so that the customer and the agent can type in messages, such as questions and answers. Also, the terms and conditions and any selections made by the customer will appear on the agent's screen. Alternatively, the agent may communicate with the customer by voice. This communication may be via a conventional telephone set or may be via a voice-over-the-Internet program. Thus, by voice, or by exchange of messages, the agent and the customer can discuss the particular terms or conditions about which the customer has questions. The transaction may then be completed by the agent or the agent may return the customer to an appropriate point in the process, such as to step 625, 645, 650 or 655.

Also, the voice connection may be established at the instance of the agent, or automatically by the company's server dialing the customer's telephone number. The telephone number may be one provided at that time by the customer, or may be a telephone number obtained from the company records concerning that customer. The agent and the customer can then discuss the particular selection, information, terms or conditions about which the customer has questions. Once these are resolved, the agent can complete the selection or information, or the customer can complete it. Also, the agent can complete the selection or information for the customer and ask the customer to review and approve the selection or information. The customer can then review the selection, information, terms or conditions, and indicate approval of same by clicking on a box, or sending an e-mail message, or taking some other action which verifies that the customer has approved and agreed to the selection, information, terms or conditions. Again, as specific information about the customer is known, the customer is preferably connected to the most appropriate agent for that customer.

This same situation may occur with respect to the process of FIG. 2 where the customer is completing a packet but does not understand certain terms or conditions. In the preferred embodiment the customer may click a "Send to Agent" box, or a "Send Incomplete Packet" box, or just a "Send" box, as shown in FIG. 3, where information is missing from the packet or document. In these cases, a packet will be sent to an agent, and the agent is directly connected to the customer. The customer may then be invited to access a web page, or a private "chat room", where a dialog box is established for the agent and the customer to exchange messages or information. The agent may also communicate with the customer by voice, as indicated above.

By voice, or by exchange of messages, the agent and the customer can discuss the particular terms or conditions about which the customer has questions. Once these are resolved, the agent can complete the information, or the customer can complete the information, or the agent can complete the information and send it to the customer for review and approval, and the customer can approve the information by sending a packet back or by sending an e-mail message approving the information, or checking an "I agree" box on the web page, or taking some other action which verifies that the customer has approved and agreed to the terms and conditions.

If, in step 615, further assistance was not requested, then step 625 is performed, wherein the selected terms from the customer are received.

Step 630 tests whether the received terms are acceptable. If the received terms are acceptable, then step 635 is performed, wherein another web page is sent to the customer, and this web page indicates the selected terms and tentative approval thereof. If the received terms are not acceptable, then step 640 is performed, wherein another web page is sent to the customer. This web page indicates the rejection of the selected terms, preferably indicating which terms were not acceptable, and proposing acceptable terms and/or settings for the acceptable limits on the unacceptable terms. Step 610 is then performed.

At step 610, if the customer requested a packet, then in step 645 a packet, as described above, is sent to the person, such as via e-mail or via downloading. The customer can then complete and resubmit the terms.

At step 650 the web server receives an e-mail message from the customer enclosing the completed packet, or a request from the customer to upload the completed packet to the server. The web server then accepts the enclosed packet or grants permission to the customer to upload the packet.

In step 655, the received packet is received. Step 625 is then performed.

When a call center is launching a campaign, such as a collections campaign, or a sales campaign, or a polling campaign, time and events are money. That is, there is usually a time element involved, and charges may be incurred based, upon the number of calls attempted or the amount of time spent, even if a call or attempted transaction is unsuccessful. Further, many such campaigns are often temporary, lasting only a few days, and then the agents are assigned to another campaign, with different customers or debtors, with different products or services, etc. Thus, the success of a campaign may depend upon whether the campaign occurs at a time when the called parties are willing and available to answer the call.

The present invention avoids this problem. Instead of launching a telemarketing campaign by conventional voice telemarketing, the present invention provides for launching the telemarketing campaign by sending e-mail messages to the targeted customers or debtors. Then, after allowing a desired or appropriate amount of time for any responses to the e-mails, the next step is to follow up by the conventional voice campaign. The desired or appropriate amount of time may be, for example, a few hours, or a day, or several days. The follow up is preferably to persons who did not respond to the e-mail messages, and/or to persons who responded by indicating an interest in the subject of the e-mail. Thus, the follow up telemarketing campaign is directed to fewer, and more specific, targets. Alternatively, the success of the e-mail campaign can determine the need for the follow up campaign, and may eliminate a follow up campaign.

Further, a campaign may be a three-pronged attack, the first prong is by e-mail to the targeted persons, the second prong, the follow up, is by voice contact, and the third prong is by e-mail again. The third prong may be directed to those persons who were not contacted or responsive to the first two prongs, or to persons who fell outside the timing requirements, or to those targets whose value does not warrant the use of other resources.

Figure 7A:
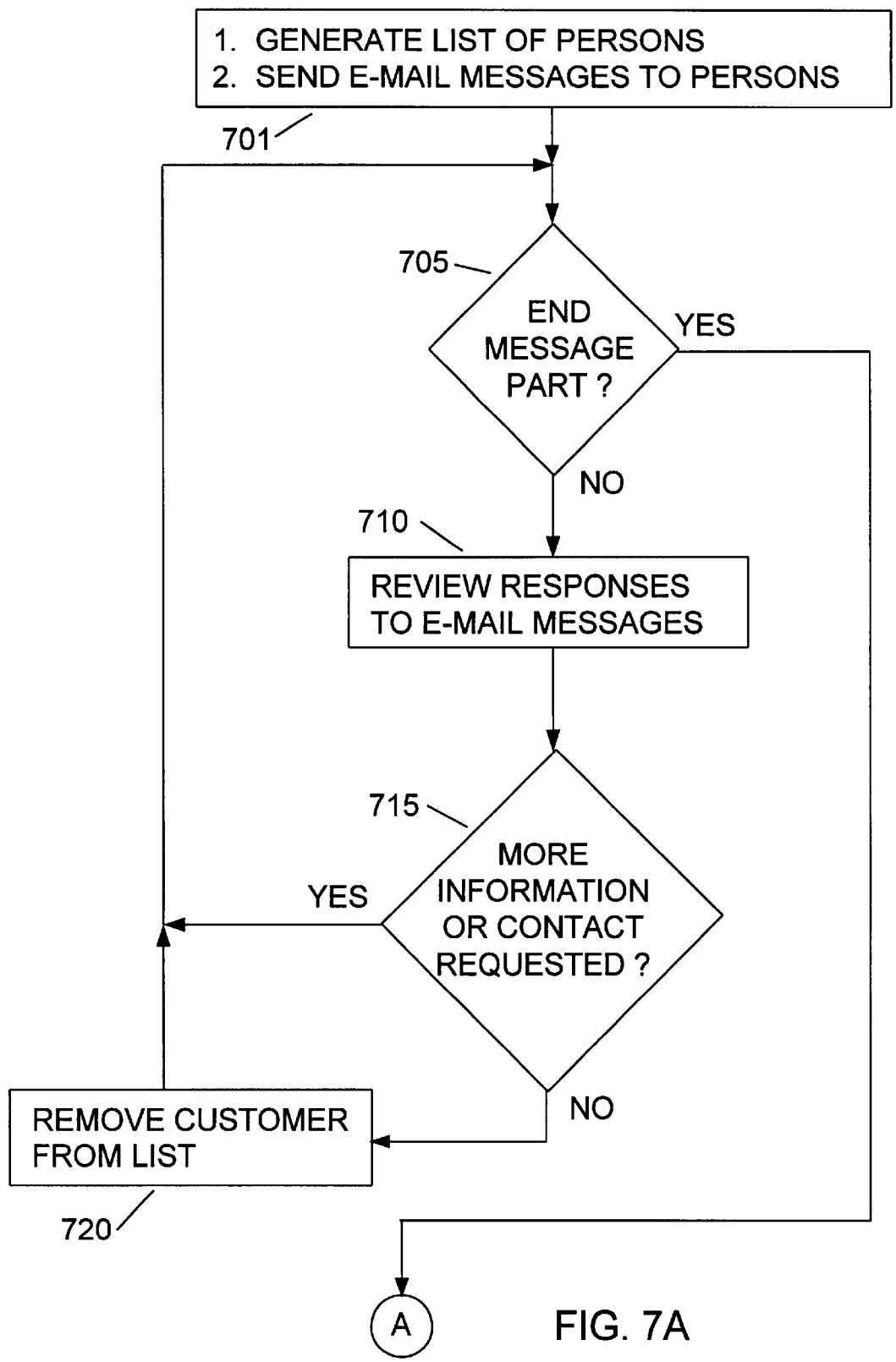
FIGS. 7A–7B are a flow chart of the operation of the preferred method of initiating contact with customers using the present invention.
Figure 7B:
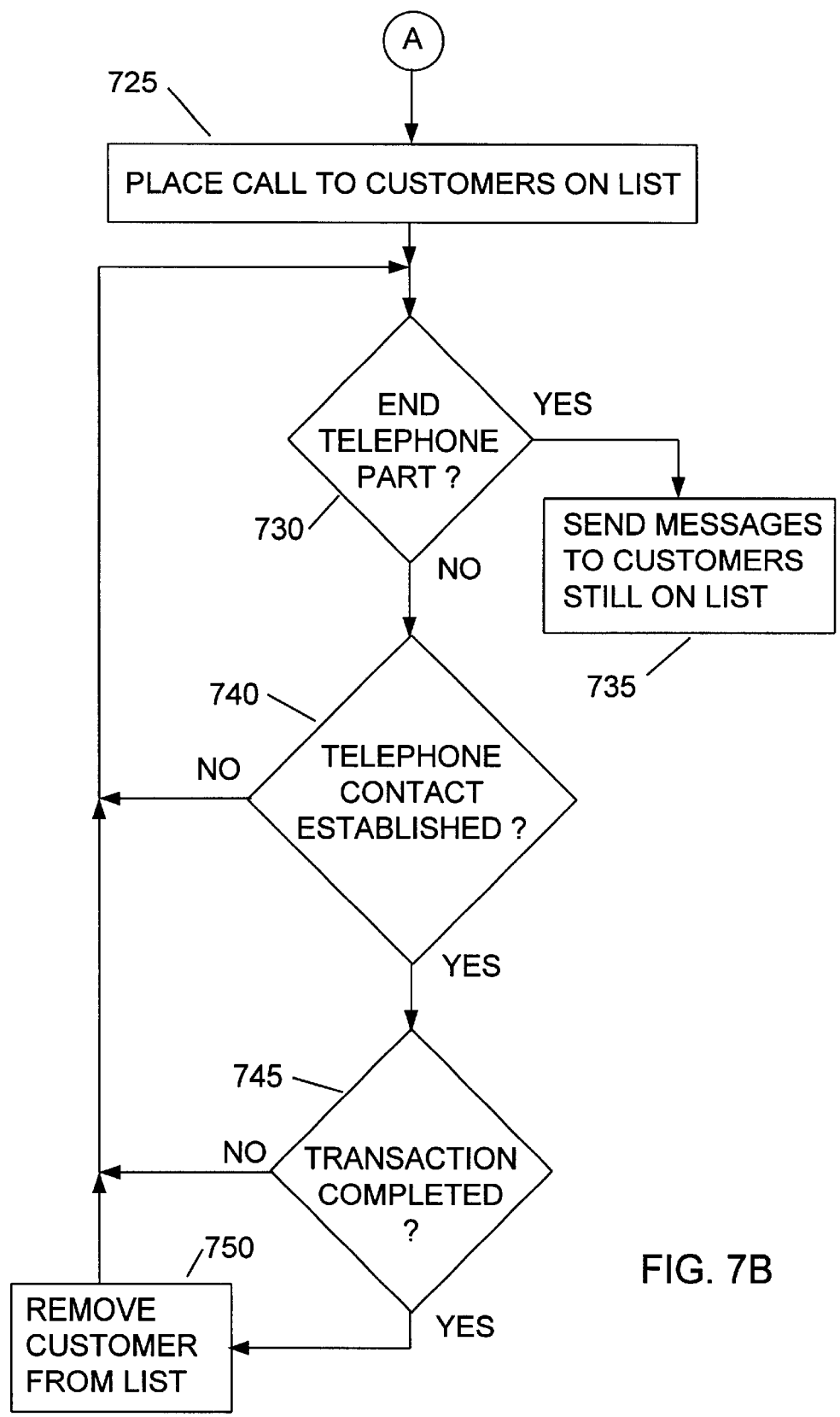

FIGS. 7A–7C are a flow chart of the operation of the preferred method of initiating contact with customers using the present invention. In step 701 a list of customers to be contacted for a campaign is generated or obtained, and e-mail messages are sent to those persons. The e-mail messages may enclose a packet or invite the customer to visit a customized web site, as described above.

Step 705 then determines whether the first part of the campaign has concluded. This may be based on any desired criteria, such as the number of responses, the number of days or hours that the first part of the campaign has been in operation, the amount of sales or collections, etc.

If the first part has not yet concluded, then step 710 receives and reviews any responses to the e-mail messages. The responses may be completed and returned packets, or visits to the customized web sites.

Step 715 determines whether the customer has requested more information, or contact with an agent. If so, then step 705 is performed. If not, then the customer has not responded to the e-mail message and has not requested further contact, so there is no need to contact the customer further at this time. Therefore, in step 720, the customer is removed from the list. Step 705 is then executed. Steps 710, 715 and 720 generate a second list which has those customers who still need to be contacted, that is, those customers have not responded to the e-mail messages, or have requested contact by an agent. This second list may be created by modifying the original list, or by copying the original list and then removing those customers who have responded, or by any other appropriate means.

In step 705, once the first part of the campaign has been concluded, step 725 begins the second part of the campaign by placing telephone calls to those customers on the second list. Alternatively, the contact in step 725 may be accomplished via instant messaging. If the customer's identification is known, an instant message session may be immediately commenced. If the customer's identification is not known, an automated search may be used to locate said customer. Once the identification is known, an instant message session may be immediately commenced. Step 730 then tests whether the second part of the campaign has been concluded. The criteria may be the same as for the first part, or may be different, as desired for the objective desired to be accomplished. If not, then the calling campaign is started. Step 740 tests whether contact has been established, that is, whether the customer and an agent have been connected to discuss and resolve the transaction in issue. If not, such as where there is no answer, the customer cannot be messaged online, or there is a busy signal, then step 730 is performed.

If contact has been made, then step 745 tests whether the transaction has been completed. If not, then step 730 is performed. If the transaction has been completed, then in step 750 that person is removed from the second list. Steps 740, 745 and 750 create a third list, such as in the same manner as the second list was created. In this case, customers on the second list are removed if they were successfully contacted.

Once the second part of the campaign has been concluded, as tested by step 730, then step 735 sends a follow up e-mail message to those persons on the third list, that is, those persons who did not respond to the first e-messages or to the attempted telephone contacts.

Thus, a three-prong attack has been mounted: e-mail messages, followed by contact to those not responding to the e-mail messages, followed by another set of e-mail messages to those customers who did not respond to the first e-mail messages or to the telephone calls. Alternatively, the messages sent in step 735 may be conventional mail messages, especially where a first e-mail message was returned due to a bad address.

Figure 8:
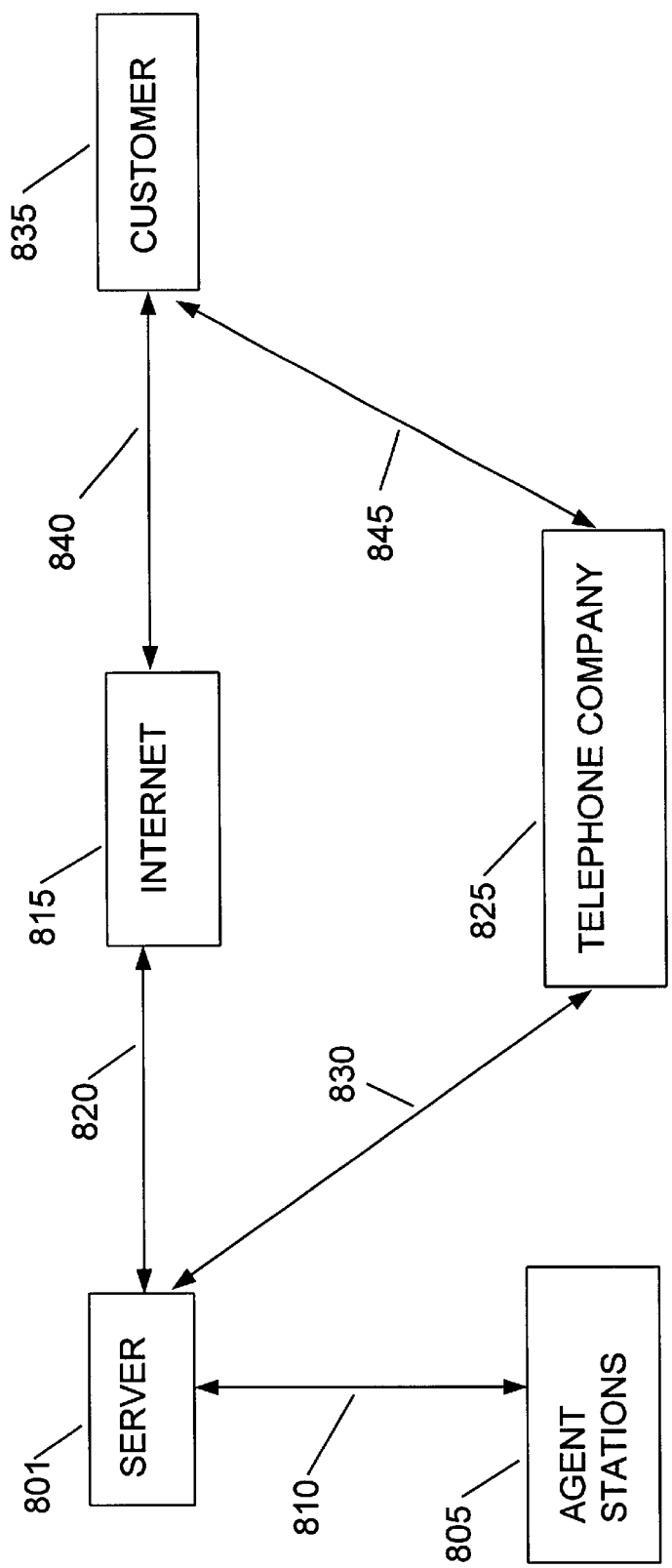
FIG. 8 is a block diagram of the preferred embodiment of the present invention.

FIG. 8 is a block diagram of the preferred embodiment of the present invention. The company server 801 is connected to a plurality of agents at agent stations 805. The connection 810 provides both voice and data communications. The server 801 is connected to the Internet 815 via connection 820 and to the public telephone network (the telephone company) 825 via connection 830. The connections 820 and 830 may be via the same communications link if desired, such as a high speed data link.

Also, the customer 835 is connected to the Internet 815 and the telephone company 825 via connections 840 and 845, which may be the same communications link, such as a single telephone line, or different links, such as two distinct telephone lines. The server 801 can connect an agent at an agent station 805 to a customer 835 via the Internet 815, the telephone network 825, or both.

The server 801 obtains and reviews the customer information, generates the terms and limits, reviews the selected or proposed terms, and indicates approval or rejection, sends and receives e-mail messages, presents the web displays, uploads and downloads packets, connects agents to customers, etc. The server 801 may be a single device which performs all of these functions, or may be two or more devices which are interconnected to perform the necessary functions, such as a web sever and a call center or mainframe or database.

Any type of desired information may be provided via the e-mail message or packet or web site. For example, if the transaction at issue is an insurance claim, then the information provided could contain, by way of illustration, pictures, claim or settlement or release forms, damage estimates, statements, contact names, etc. The information may be provided via one, more than one, or all of these communications devices. For example, some information may be provided via the e-mail message, other information provided via an attached packet, and still other information provided via the company web site or a customized web site. The customer then reviews the information, makes an changes or comments necessary, approves it, and returns it if appropriate. The insurance company can then proceed to the next step in the business process.

As another example of use of the present invention, a customer could visit a new or used car sales web site and indicate an interest in purchasing a particular car. In response, the new or used car sales company would send the customer an e-mail, or a packet, or an invitation to a web site, providing information on the selected car, alternative cars, pricing, purchase plans available, forms for completion, warranty terms or plans available, etc. The customer could then review the information, make a selection, and complete the appropriate forms. The customer could even propose a different price or financing terms. The company can review the selection and forms and proposals provided by the customer, and approve the transaction or propose an alternative transaction or terms. Once the negotiations have been completed and the transaction approved, then the final forms can be sent to the customer for approval. Once the customer approves and returns the forms, the transaction is essentially completed. The only things left is for the customer to go to the company, ascertain that the car ordered is the car that is ready, and drive away in the car. Thus, the transaction has been made without the customer having to bother with going to company offices except to pick up the car. The customer has thus been able to purchase a car in the convenience of home, and at the time of day and day of the week convenient to the customer, and also while avoiding traffic and weather conditions. Further, the company has made a sale without having to keep numerous salespersons on the car lot day and night so as to be available to a prospective customer.

It will therefore be appreciated that the present invention provides for implementing business transactions over an electronics communications medium, such as the Internet. The present invention allows the customer or debtor to conduct the business transaction in the convenience, privacy and comfort of home, or while traveling, at the time and day convenient to the customer, and to avoid having to go to a company office or talk directly with a person. The present invention allows the customer to perform some of the work or tasks that the company would normally have to pay an agent to do, thus the customer is performing as an unpaid agent of the company.

The present invention allows the company to reduce costs by reducing the number of agents or salespersons that must be available to conduct business transactions because the customer performs some of the functions of the agent, by reducing the time and days that the agents or salespersons must be available, and by allowing part of a campaign to be conducted electronically, either without the involvement of agents or with minimal involvement of agents.

Other embodiments and uses of the present invention will become apparent from reading the above description and reviewing the drawings. Accordingly, the scope of the present invention is to be limited only by the claims below.

We claim:

1. A method for conducting business, comprising the steps of:
    establishing a web site customized for an individual;
    sending a first message to said individual inviting said individual to visit said customized web site;
    receiving a request from said individual to visit said customized web site;
    sending a first web page to said individual, said first web page allowing said individual to download a first packet, said first packet including a plurality of transaction terms;
    receiving a request from said individual to download said first packet;
    sending said first packet to said individual;
    receiving a request from said individual to upload a second packet, said second packet being based upon said first packet;
    sending approval to said individual to upload said second packet;
    receiving said second packet from said individual;
    inspecting said second packet for selected transaction terms;
    determining whether said selected transaction terms are acceptable: and
    sending a second message to said individual indicating approval or rejection of said selected transaction terms.

2. The method of claim 1, wherein said step of sending said first packet comprises generating said first packet by including a plurality of said transaction terms.

3. The method of claim 1, wherein said step of sending said first packet comprises generating said first packet by including a plurality of said transaction terms, and wherein said step of determining whether said transaction terms which were selected are acceptable comprises comparing said selected transaction terms with limits on said transaction terms.

4. The method of claim 1, wherein said step of sending said first packet comprises generating said first packet by including a software applications program.

5. The method of claim 1, wherein said step of sending said first packet comprises generating said first packet by including a software applications program and a plurality of transaction terms.

6. The method of claim 1, wherein said step of sending said first packet comprises generating said first packet by including a software applications program, a plurality of transaction terms, and predetermined limits for said transaction terms.

7. The method claim 1, wherein said step of sending a message to said individual inviting said individual to visit said customized web site includes providing said individual with information to access said customized web site via an identification code.

8. The method of claim 1, wherein said step of determining whether said transaction terms are acceptable further comprises determining whether said transaction terms were received in a timely manner.

* * * * *